United States Patent
Becker et al.

(10) Patent No.: US 8,683,283 B2
(45) Date of Patent: Mar. 25, 2014

(54) DELTA-THETA FREQUENCY ESTIMATION

(75) Inventors: Donald W. Becker, Rancho Santa Fe, CA (US); Matthew D. Nimon, Hinckley, OH (US); William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 1131 days.

(21) Appl. No.: 12/641,537

(22) Filed: Dec. 18, 2009

(65) Prior Publication Data

US 2010/0159861 A1   Jun. 24, 2010

Related U.S. Application Data

(60) Provisional application No. 61/138,676, filed on Dec. 18, 2008.

(51) Int. Cl.
*G06F 11/00* (2006.01)
*G06F 11/30* (2006.01)
*G08C 25/00* (2006.01)
*H03M 13/00* (2006.01)
*H04L 1/00* (2006.01)

(52) U.S. Cl.
USPC .......................................................... 714/746

(58) Field of Classification Search
None
See application file for complete search history.

(56) References Cited

U.S. PATENT DOCUMENTS

| | | | |
|---|---|---|---|
| 6,563,897 B1 | 5/2003 | Kitta | |
| 7,778,363 B2 | 8/2010 | Inagawa et al. | |
| 2003/0128777 A1* | 7/2003 | Linsky et al. | 375/327 |
| 2005/0117674 A1 | 6/2005 | Jeon et al. | |
| 2006/0039453 A1 | 2/2006 | Yamada | |
| 2006/0098716 A1* | 5/2006 | Pietraski et al. | 375/144 |
| 2007/0160158 A1* | 7/2007 | Zeng et al. | 375/260 |
| 2008/0170645 A1* | 7/2008 | Kleider et al. | 375/343 |
| 2009/0016467 A1 | 1/2009 | Lui et al. | |
| 2009/0067515 A1 | 3/2009 | Galperin et al. | |
| 2010/0158179 A1 | 6/2010 | Becker et al. | |

OTHER PUBLICATIONS

Office Action (Quayle Action) for U.S. Appl. No. 12/641,451 mailed on Nov. 22, 2011; 5 pages.
Notice of Allowance for U.S. Appl. No. 12/641,451 mailed on Jan. 20, 2012; 8 pages.

* cited by examiner

*Primary Examiner* — Albert Decady
*Assistant Examiner* — Enamul M Kabir
(74) *Attorney, Agent, or Firm* — Holland & Hart LLP

(57) ABSTRACT

Systems, devices, processors, and methods are described which may be used for the reception of a wireless broadband signal at a user terminal from a gateway via satellite. A physical layer header may be identified, the header including a number of subcode blocks. A phase may be estimated for each of the subcode blocks, and intra-header phase differences may be calculated. The intra-header phase differences may be used to calculate a frequency error, which may be corrected. Frequency errors may be monitored and, when such errors fall below a threshold level, an alternative inter-frame frequency error tracking method may be used.

22 Claims, 8 Drawing Sheets

DELTA-THETA FREQUENCY ESTIMATION

CROSS-REFERENCES TO RELATED APPLICATIONS

This application claims priority from U.S. Provisional Patent Application No. 61/138,676, filed Dec. 18, 2008, entitled "SYMBOL TIMING ACQUISITION AND FREQUENCY ESTIMATION".

BACKGROUND

The present invention relates to wireless communications in general and, in particular, to a satellite communications network.

Broadband satellite services are gaining traction in North America. While such first generation satellite systems may provide multi-gigabit per second (Gbps) per satellite overall capacity, many current designs of such systems may inherently limit the number of customers who may be served with sufficient bandwidth. While existing designs have a number of capacity limitations, the demand for such broadband services continues to grow.

To meet such demands, multi-beam satellites may combine a number of high speed communication links with Variable Coding and Modulation (VCM) or Adaptive Coding and Modulation (ACM). According to the message type and the link condition, VCM and ACM transmitters utilize codes of various rates and sizes and modulations of different orders to take advantage of favorable channel conditions. Frequency estimation and carrier acquisition and tracking can present difficult challenges in such an environment, and novel techniques may be useful in addressing these issues to increase capacity to meet this demand.

SUMMARY

Systems, devices, processors, and methods are described which may be used for the reception of a wireless broadband signal via satellite. In one set of embodiments, a wireless signal is generated and transmitted from the gateway to user terminals via satellite, the signal including a series of physical layer frames. Each frame includes a physical layer header and payload. The wireless signal may be received and digitized at the terminal.

In one set of embodiments a frequency estimate is obtained using novel delta-theta methods performed within, or across, physical layer headers. The digitized stream may be processed to detect the physical layer header for a physical layer frame. The physical layer header may be made up of a code structure including a number of subcodes. Phase estimates of each subcode may be derived. The subcode phase estimates may be used to estimate a frequency error, which in turn may be used to correct the frequency for the received wireless signal. Once a carrier is acquired and the errors fall below a threshold, an inter-frame frequency error tracking scheme may be used.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, devices, processors, and methods are described which may be used for the reception of a wireless broadband signal at a user terminal from a gateway via satellite. In one set of embodiments, a physical layer header is identified, the physical layer header including a number of subcode blocks. A phase may be estimated for each of the subcode blocks, and intra-header phase differences may be calculated. The intra-header phase differences may in turn be used to calculate a frequency error, which may be corrected. The error calculation and correction process may be repeated. Frequency errors may be monitored and, when such errors fall below a threshold, an alternative inter-frame frequency error tracking method may be used.

This description provides example embodiments only, and is not intended to limit the scope, applicability, or configuration of the invention. Rather, the ensuing description will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
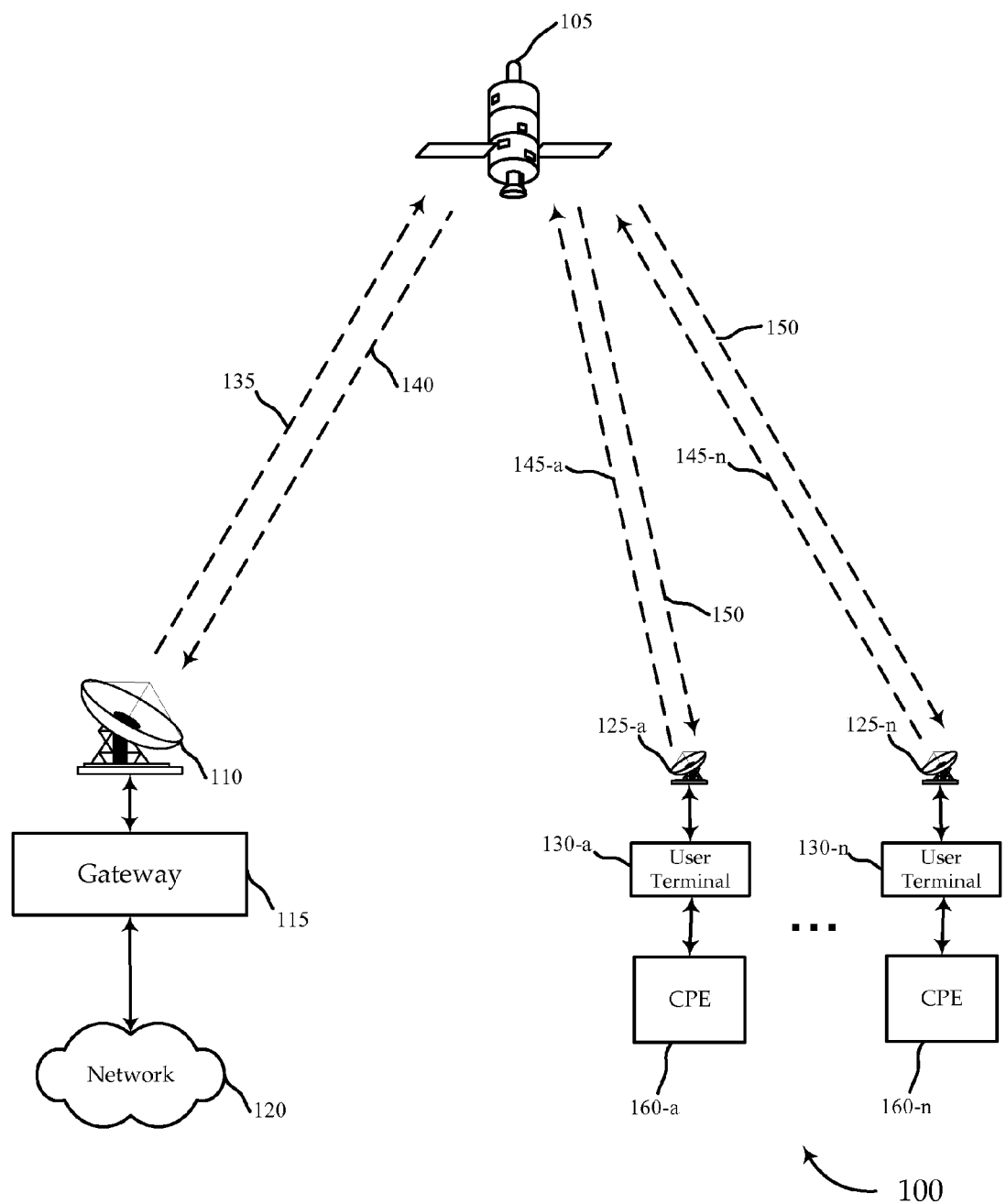
FIG. 1 is a block diagram of a satellite communications system configured according to various embodiments of the invention.

Systems, devices, methods, and software are described for frequency estimation for a received satellite communication signal. Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more user terminals 130, via a satellite 105. The frequency estimation techniques discussed herein may be used by a user terminal 130 to process signals received from a gateway 115 via satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network 120 may connect the gateway 115 with other gateways (not pictured), which are also in communication with the satellite 105, and which may share information on link conditions and other network metrics.

The gateway 115 provides an interface between the network 120 and the user terminal 130. The gateway 115 may be configured to receive data and information directed to one or more user terminals 130, and format the data and information (e.g., using CCM, ACM or VCM) for delivery downstream to the respective user terminals 130 via the satellite 105. Similarly, the gateway 115 may be configured to receive upstream signals from the satellite 105 (e.g., from one or more user terminals 130) directed to a destination in the network 120, and can format the received signals for transmission through the network 120.

A device (not shown) connected to the network 120 may, therefore, communicate with one or more user terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the Digital Video Broadcast—Second Generation (DVB-S2) and World Interoperability for Microwave Access (WiMAX) standards. The gateway 115 may use a broadcast signal, with a modulation and coding format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. In some embodiments, the gateway transmits a signal on each carrier made up of a series of physical layer frames. Each of the frames may have a physical layer header including a number of subcode blocks (e.g., in one embodiment each physical layer header includes three Walsh code blocks). Each single carrier signal may be divided in time (e.g., using Time Division Multiple Access (TDMA) or other time division multiplexing techniques) into a number of sub-channels. The sub-channels may be the same size, or different sizes, and a range of options will be addressed below. In some embodiments, other channelization schemes may be integrated with or used in place of time divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more user terminals 130. In one embodiment, the satellite 105 operates in a multi-beam mode, transmitting a number of narrow beams each directed at a different region of the earth, allowing for frequency re-use. With such a multi-beam satellite 105, there may be any number of different signal switching configurations on the satellite 105, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The signals transmitted from the satellite 105 may be received by one or more user terminals 130, via the respective user antenna 125. In some embodiments, the physical layer header may be identified, the header including a number of subcode blocks. A phase may be estimated for each of the subcode blocks, and intra-header phase differences may be calculated. The intra-header phase differences may be used to calculate a frequency error, which may be corrected. Frequency errors may be monitored and, when such errors fall below a threshold level, an alternative inter-frame frequency error tracking method may be used.

In one embodiment, the antenna 125 and user terminal 130 together make up a very small aperture terminal (VSAT). In other embodiments, a variety of other types of antennas 125 may be used at the user terminal 130 to receive the signal from the satellite 105. Each of the user terminals 130 may be a single user terminal or, alternatively, be a hub or router (not pictured) that is coupled with multiple user terminals. Each user terminal 130 may be connected to consumer premises equipment (CPE) 160 (e.g., computers, local area networks, Internet appliances, wireless networks, etc.).

A Multi-Frequency Time-Division Multiple Access (MF-TDMA) scheme is used for upstream links 140, 145, allowing efficient streaming of traffic while maintaining flexibility in allocating capacity among each of the user terminals 130. In this embodiment, a number of frequency channels are allocated which may be fixed, or which may be allocated in a more dynamic fashion. A TDMA scheme is then employed in each frequency channel. In this scheme, each frequency channel may be divided into several timeslots that can be assigned to a connection (i.e., a user terminal 130). In other embodiments, one or more of the upstream links 140, 145 may be configured with other schemes, such as TDMA, FDMA, OFDMA, CDMA, or any number of hybrid or other schemes known in the art.

A user terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The user terminal 130 itself may measure or estimate the signal quality, or it may pass information measured or estimated by other devices. A user terminal 130 may also transmit data and information to a network 120 destination via the satellite 105 and gateway 115. The user terminal 130 transmits the signals via the upstream uplink 145 to the satellite 105 using the antenna 125. A user terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement ACM, adjusting the modulation and coding formats to each terminal or set of terminals based on their link conditions.

Figure 2A:
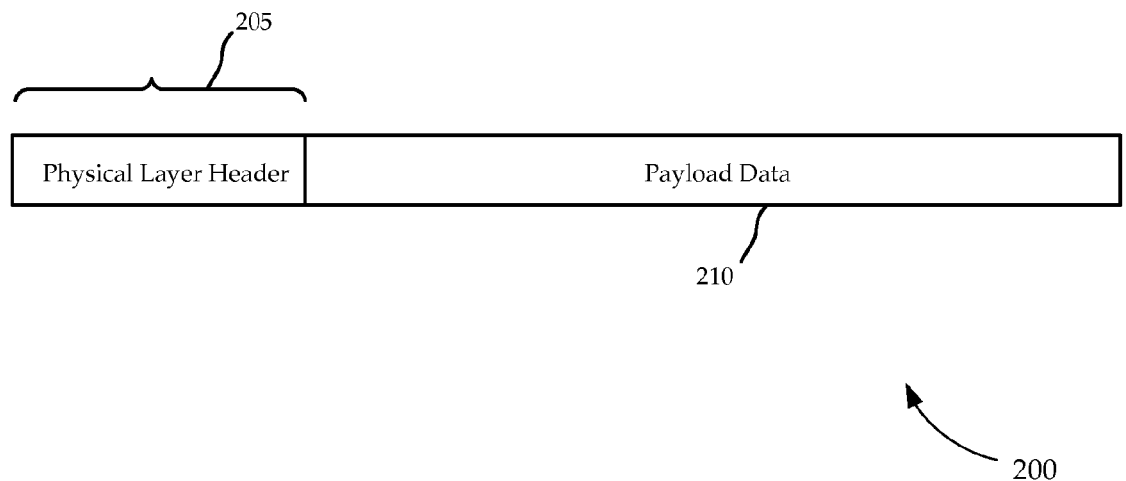
FIGS. 2A and 2B are block diagrams illustrating example physical layer frame formats according to various embodiments of the invention.

When a gateway 115 has selected the applicable modulation and coding, it may encapsulate data received from the network to be transmitted via the satellite 105 to a user terminal 130. FIG. 2A is a block diagram illustrating an example physical layer frame format 200 that may be used. A physical layer header 205 may be made up of encoded data including a sub-channel identifier and modulation and coding data. The physical layer header 205 may be made up of a code block including a number of subcodes. As noted, phase estimates of each subcode may be used to estimate a frequency error. Any number of different techniques (e.g., using a known unique word in the physical layer header) may be used to identify the location of the physical layer header 205 or the start of a frame 200.

The payload data 210 may be the payload for the physical layer frame 200, and may be one or more IP packets, encapsulated in a MAC frame which is FEC encoded and modulated (e.g., it may be, or be equivalent to, a FEC or XFEC frame under the DVB-S2 standard).

The physical layer header 205 (or parts thereof) may be protected by very low code rates so that it may be reliably received during excellent, or poor, SNR conditions. The modulation and coding data in the physical layer header 205 may identify the modulation and coding (e.g., the particular codeword sizes, code rates, modulation schemes, and pilot insertions) for encoded and modulated payload data 210 that is appended to the physical layer header 205. The encoded and modulated payload data 210, however, is in many embodiments adaptively coded on a per-terminal (or per set of terminals) basis. By way of example, user terminal 130 receiving a transmitted signal at a very low SNR may receive a frame 200 in which the encoded and modulated payload data 210 has been encoded at a very low code rate and at a very low order modulation. Conversely, a terminal 130 receiving a transmitted signal at a very high SNR may receive a frame 200 in which the encoded and modulated payload data 210 has been encoded at a very high code rate and at a very high order modulation.

In addition, physical layer header 205 may include a sub-channel identifier configured to identify different frames as belonging to particular sub-channels. By utilizing sub-channel identifiers in a physical layer header 205, receiving devices (e.g., the user terminals 130) may filter packets based on the sub-channel identifier without demodulating or decoding the payload data 210. Thus, the information to be demodulated and decoded (e.g., payload data 210 directed to other sub-channels and other user terminals 130) may be limited or otherwise filtered thereby. A given sub-channel may, therefore, be a fraction (e.g., ¼, ⅛, 1/16) of the downstream channel. A user terminal 130 may be configured to filter a frame 200, demodulating and decoding payload data 210 only if the sub-channel identifier in the physical layer header 205 matches one or more sub-channels for the terminal.

Figure 2B:
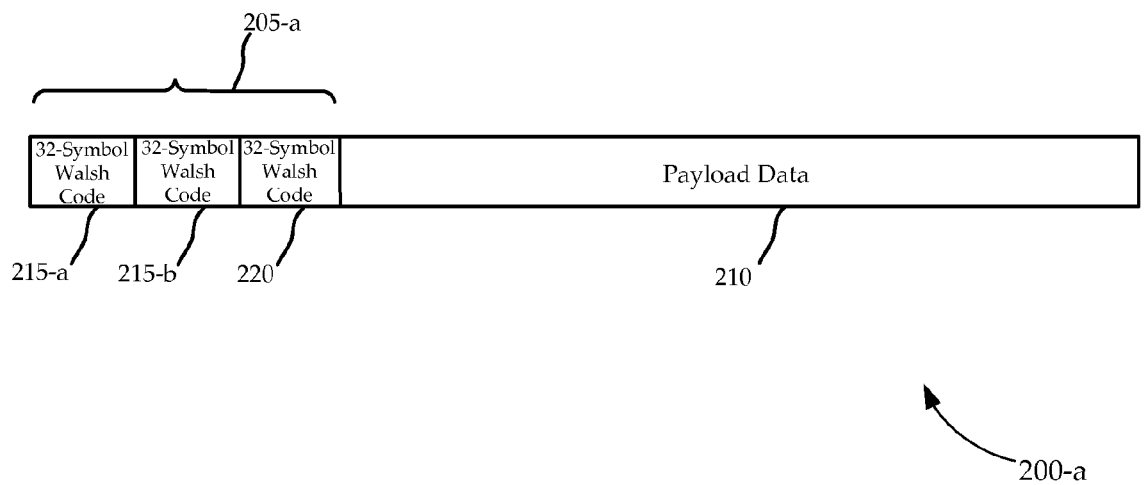

FIG. 2B illustrates an example embodiment of physical layer frame 200-a, which may be the physical layer frame of FIG. 2A. As noted above, a physical layer header 205 may be a code structure with a number of subcodes. In the example, the physical layer header 205-a is a 96-symbol physical layer header at the start of each physical layer frame. The physical layer header 205-a includes three 32-symbol signaling words ((32,5) Walsh codes), which may be the subcodes used for calculating a frequency estimate (e.g., using the delta-theta methods described in more detail below).

In one embodiment, the first two Walsh code blocks 215 each include five bits of information, while the third Walsh code block 220 includes parity (or other redundancy) information. In some embodiments, the first 16 bits of each code block have certain symmetric relationships with the second 16 bits of the respective code block. Such symmetrical, or asymmetrical, properties within the structure of a code may be used to identify the starting point of the frame or a future frame, and/or the location of the header. Other codes may be used in other embodiments (e.g., different codes, of different lengths), and the symmetrical or asymmetrical properties with the structure of the code may be used to identify the start and synchronize the incoming frames. Moreover, the frequency estimation techniques described below may be used with different codes, of different lengths, and for different numbers of subcodes.

Figure 3:
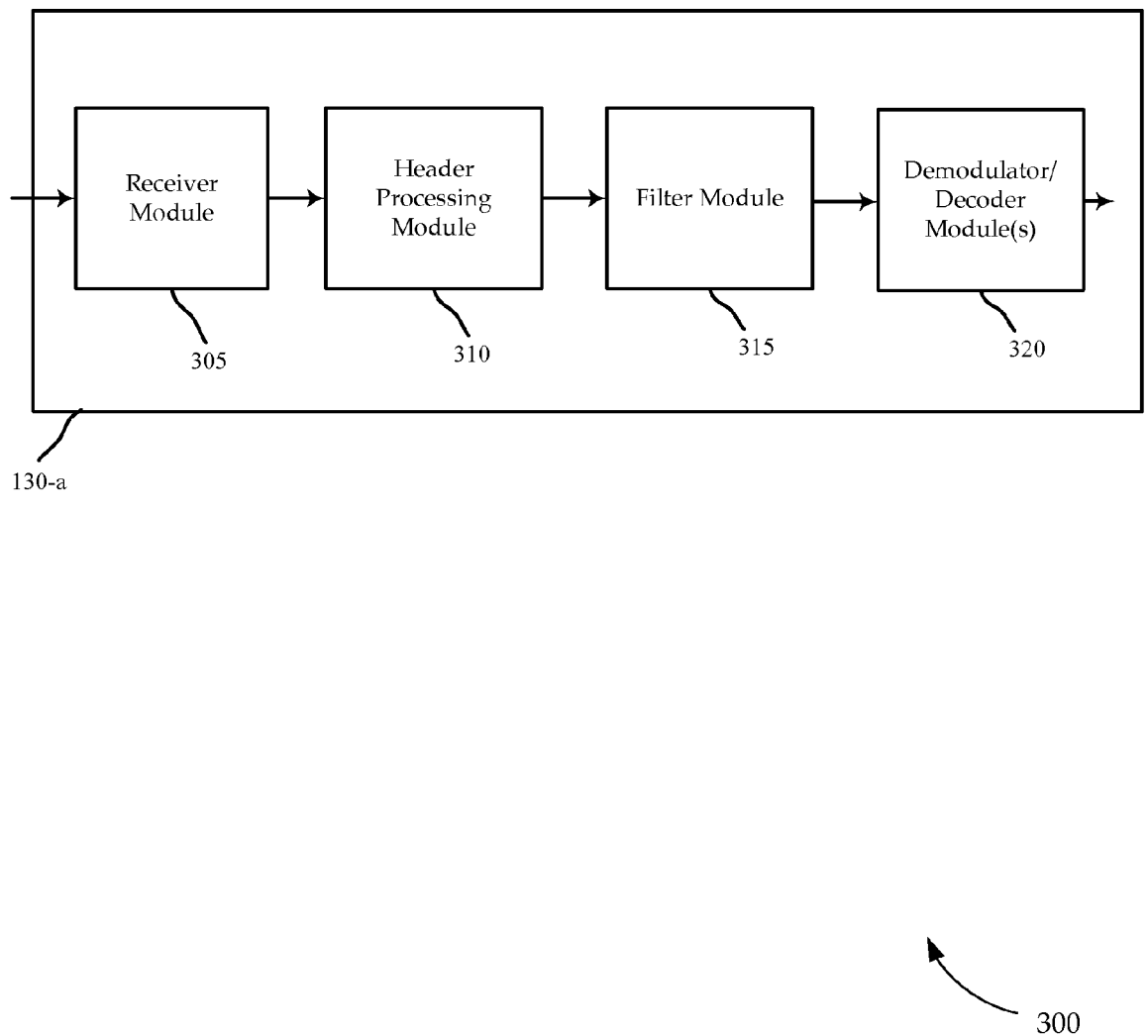
FIG. 3 is a block diagram of a user terminal for a satellite communications system configured according to various embodiments of the invention.

Referring next to FIG. 3, an embodiment of a user terminal 130-a (e.g., the user terminal 130 of FIG. 1) is shown in block diagram form 300. In this embodiment, the user terminal 130-a includes a receiver module 305, a header processing module 310, a filter module 315, and a demodulator/decoder module(s) 320, each in communication with each other directly or indirectly. These modules of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each unit may include memory, or accessed memory may be elsewhere on or off the terminal 130.

The receiver module 305 may be configured to receive a wireless signal transmitted via a satellite. This may, for example, be the signal transmitted from the gateway 115 through the satellite 105 as described with reference to FIG. 1, received via the user antenna 125. The receiver module 305 may downconvert and digitize the signal. In digitizing the received signal, the receiver module 305 may perform symbol timing recovery. In one embodiment, I and Q symbols are generated by the receiver module 305 at a rate of one sample per symbol. The symbols are run through a pair of filters that interpolate to ¼ symbol period early and ¼ symbol period late. The early and late I/Q pairs may be processed to get a symbol timing error metric. The errors may be averaged to normalize the error with respect to step size, and then input to acquire and track the symbol timing. A number of alternative symbol timing schemes may be used in other embodiments.

In addition, the receiver module 305 may detect and remove quadrature errors, perform coarse frequency rotation, and provide matched filtering functions. The digitized signal may be forwarded by the receiver module 305 to the header processing module 310. The header processing unit 310 may, therefore, receive a digitized physical layer signal made up of a series of symbols representative of the received wireless signal. This digitized stream may be made up of in-phase and quadrature components.

The header processing module 310 may process the digitized stream to detect a start of frame (e.g., physical layer frame 200 for FIG. 2A or 2B) location for a series of frames. The header processing module 310 may use a variety of different techniques to identify the start of frame/physical layer header location (e.g., using a unique word correlation). The header processing module 310 may then demodulate and decode a physical layer header (e.g., physical layer header 205 for FIG. 2A or 2B). A frequency estimate may be obtained by the header processing module 310 using the novel techniques performed within, or between, physical layer headers. As noted, the physical layer header may be made up of a code structure in which a number of subcodes are defined. Phase estimates of each subcode may be derived, and intra-header phase differences may be used to calculate a frequency error, which may be corrected. The error calculations and corrections may be repeated in an iterative process. Frequency errors may be monitored and, when such errors fall below a threshold, an alternative inter-frame frequency error tracking method may be used.

A filter module 315 may be configured to store one or more sub-channel identifiers (for example, sub-channel identifiers such as those in the physical layer header 205 in FIG. 2), the stored sub-channel identifiers indicating whether physical layer payload associated with the particular sub-channel identifier is to be demodulated and decoded by the user terminal 130-*a*. The filter module 315 may include the memory storing the information, or may access external or other on-chip memory. The filter module 315 may determine whether a given sub-channel identifier matches one or more of the stored identifiers indicating that an associated physical layer payload should be dropped before further demodulation and decoding. As indicated by the sub-channel identifier, the filter module 315 may then either (a) drop (or otherwise filter) the physical layer payload associated with the header portion to prevent demodulation and decoding, or (b) forward the physical layer payload associated with the second header portion to the demodulator/decoder module(s) 320. The filter module 315 and the demodulator/decoder module(s) 320 need not be included in some embodiments.

Figure 4:
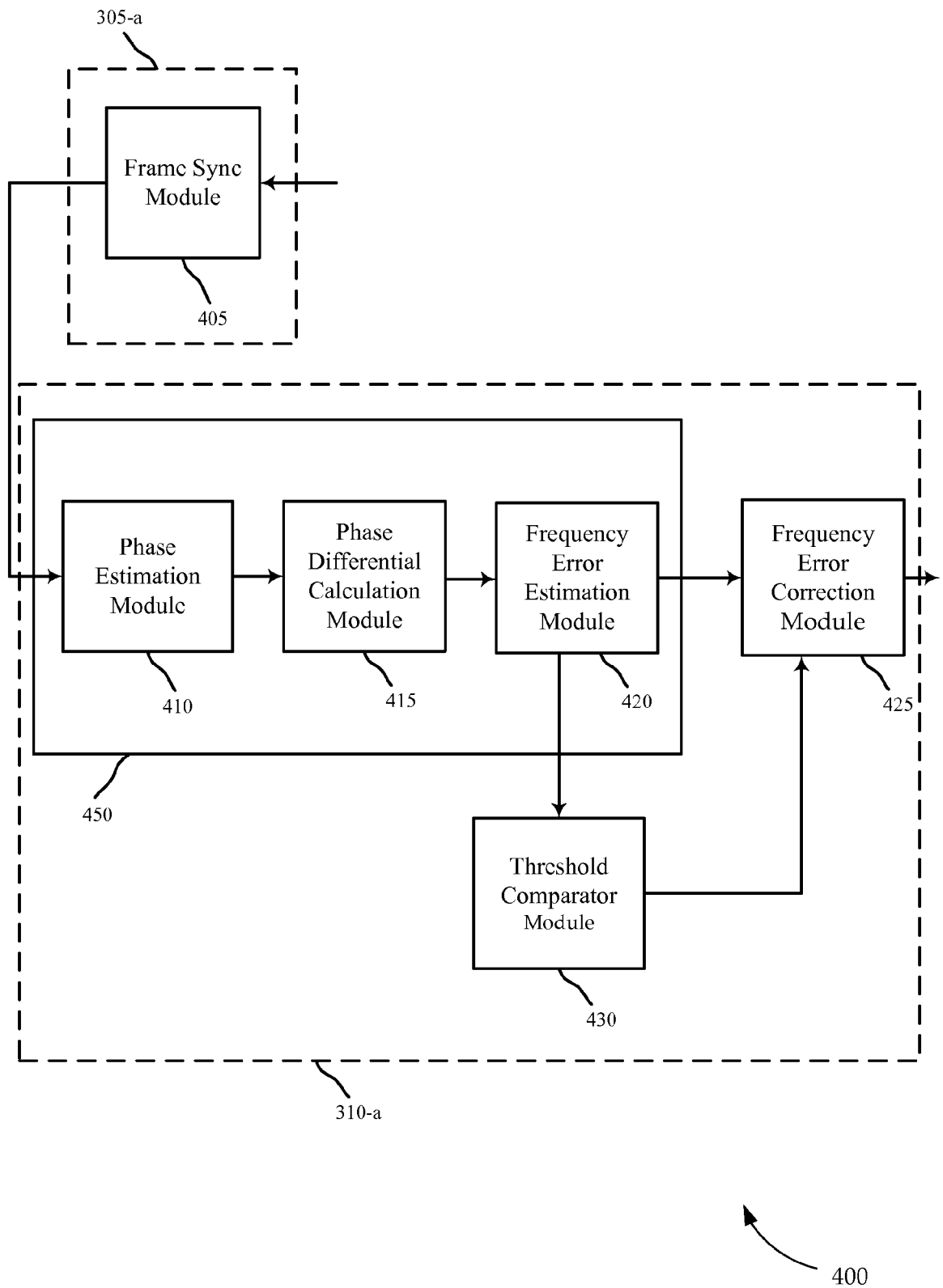
FIG. 4 is a block diagram of a configuration for frequency estimation configured according to various embodiments of the invention.

As set forth above, there are a number of ways a frequency estimate may be obtained within, or across, physical layer headers. Turning next to FIG. 4, a block diagram 400 is shown illustrating a portion of a receiver module 305-*a* (e.g., receiver module 305 of FIG. 3) and a portion of a header processing module 310-*a* (e.g., header processing module 310 of FIG. 3). Components (individually or collectively) may be implemented in one or more other processors and/or devices. The receiver module 305-*a* of the illustrated embodiment includes a frame sync module 405. The header processing module 310-*a* of the illustrated embodiment includes a phase estimation module 410, a phase differential calculation module 415, a frequency error estimation module 420, a frequency error correction module 425, and a threshold comparator module 430.

In one embodiment, a receiver module 305-*a* may receive a wireless signal (e.g., from the gateway 115 via the satellite 105 of FIG. 1), and generate a digitized stream representative of the wireless signal. The digitized stream may be processed by the frame sync module 405 to identify one or more physical layer headers (e.g., header 205 of FIG. 2A or 2B) for a series of physical layer frames (e.g., frames 200 of FIG. 2A or 2B) in the digitized stream. Within a given header, there may be a code structure in which a number of subcode blocks (e.g., the three Walsh codes of FIG. 2B) are defined. A phase estimation module 410 may estimate a phase for at least some of the subcode blocks. This may be performed by decoding the subcode blocks, and then using the decoded information to estimate the phase of the subcode blocks.

The phase differential calculation module 415 may calculate a first phase difference between a first two of the subcode block phase estimates. The phase differential calculation module 415 may calculate a second phase difference between a second two of the subcode block phase estimates. In one embodiment, the first phase difference may be between a first subcode and a second subcode, and the second phase difference may be a difference measurement between the second subcode and a third subcode. In other embodiments, there may be more than two difference calculations. A frequency error estimation module 420 may use the first phase difference and the second phase difference to calculate a frequency error (e.g., by calculating average of the first phase difference and the second phase difference, or performing other comparisons). This frequency error may be referred to as an intra-header frequency error (and, thus, the phase estimation module 410, phase differential calculation module 415, and frequency error estimation module 420 may together make up an intra-header module 450).

The frequency error correction module 425 may correct a frequency for receiving a wireless signal utilizing the calculated frequency error. For example, the frequency error may be converted to a usable frequency error value and input to a PI control unit to pull a digital demodulator frequency. The frequency error correction module 425 may utilize a single error value, or an average error value over various window sizes (which may be selectable by a user). Thus, the intra-header frequency error may be calculated for a series of physical layer headers (e.g., the intra-header module 450 may perform calculations on each of a number of headers). The calculated errors may be used individually or collectively to correct the frequency for a received signal.

The threshold comparator module 430 may monitor the calculated frequency error for one or more of physical layer headers to determine when the monitored frequency errors (e.g., an average or weighted average) fall below a threshold. The threshold comparator module 430 may be an IIR filter and associated processing unit where the filter output is compared against a threshold (e.g., which may be set by the user). The frequency error correction module 425 may continue to iteratively correct the frequency error for the received wireless signal utilizing calculated frequency errors for the additional physical layer headers until the monitored frequency errors fall below the threshold. When the error drops below a threshold, carrier lock may be asserted and frequency control input may be removed from the intra-header module 450 (e.g., and given to an inter-frame delta-theta calculation). In some embodiments, if the filter output later exceeds a threshold (which may be the same, or different), carrier lock is lost, and the carrier control comes back to the intra-header module 450.

In one set of embodiments, a random frequency generator (not shown) in the header processing module 310-*a* may drive a random frequency search before physical layer frame synchronization is achieved. Once the physical layer frame synchronization has been achieved, the intra-header module 450 in the header processing module 310-*a* may perform additional calculations to aid in the completion of the carrier acquisition process.

Figure 5:
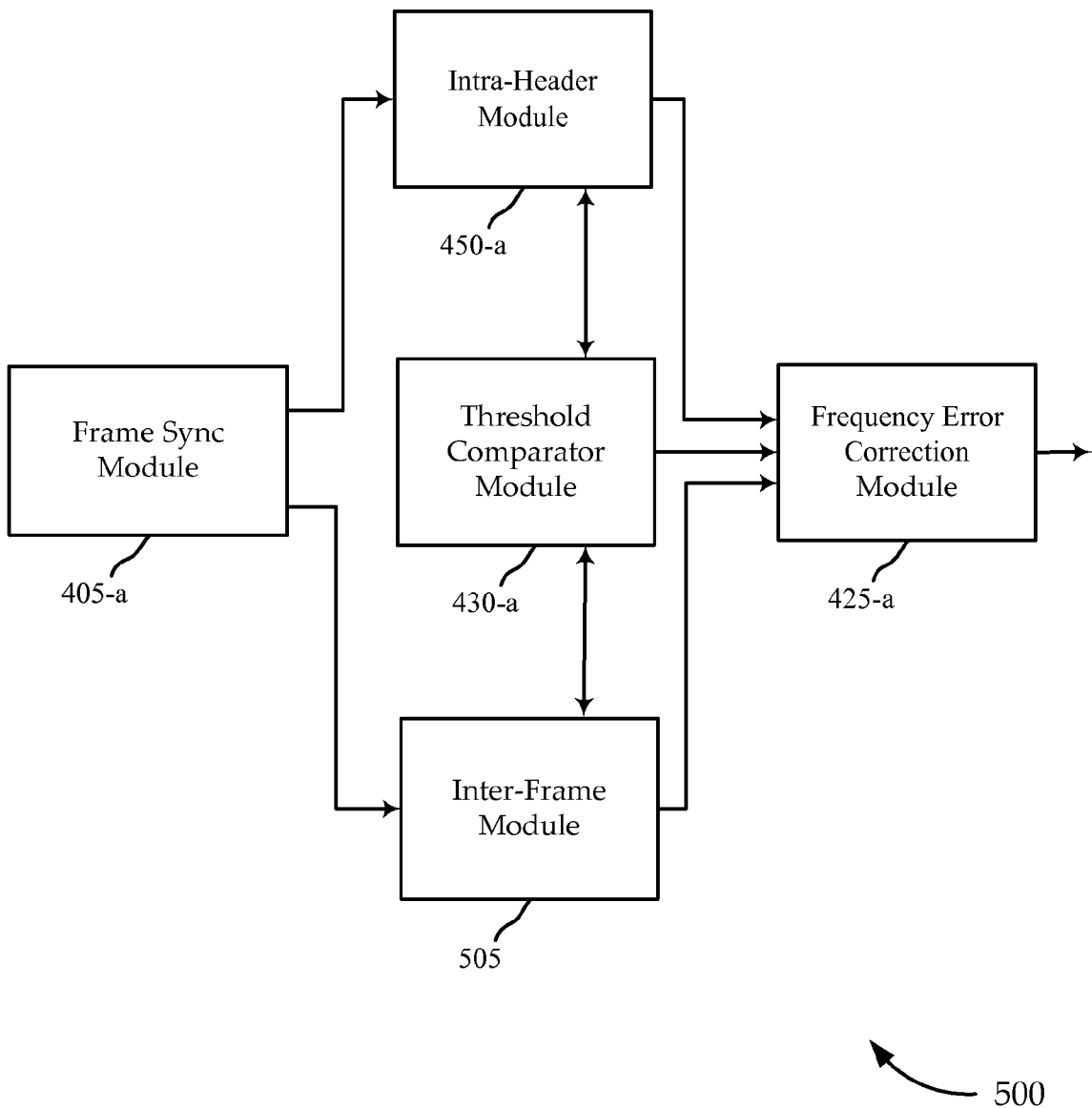
FIG. 5 is a block diagram of an alternative configuration for frequency estimation and correction configured according to various embodiments of the invention.

Turning next to FIG. 5, a block diagram 500 is shown illustrating an example configuration which may be used for frequency estimation. The configuration may be implemented in the user terminal 130 of FIG. 1 or 3, or may be implemented in one or more other processors and/or devices. The illustrated configuration includes a frame sync module 405-*a*, an intra-header module 450-*a*, a frequency error correction module 425-*a*, a threshold comparator module 430-*a*, and an inter-frame module 505.

The frame sync module 405-*a* may identify one or more physical layer headers (e.g., header 205 of FIG. 2A or 2B) for a series of physical layer frames (e.g., frames 200 of FIG. 2A or 2B) making up a received wireless signal. The intra-header module 450-*a* may estimate, for some or all of the physical layer headers, an intra-header frequency error utilizing intra-header phase difference measurements. Thus, the intra-header module 450-*a* may, but need not be, the intra-header module 450 of FIG. 4.

The frequency error correction module 425-*a* may iteratively correct a frequency error for the received wireless signal utilizing the calculated frequency errors from the intra-header module 450-*a*. Various averaging schemes may be used for correcting the errors over a number of frames. The frequency error correction module 425-*a* may, but need not be, the frequency error correction module 425 of FIG. 4.

The threshold comparator module 430-*a* (e.g., the threshold comparator module 430 of FIG. 4) may monitor the calculated frequency errors from the intra-header module 450-*a*. When the monitored errors fall below a threshold level, the threshold comparator module 430-*a* may signal the frequency error correction module 425-*a* to suspend use of the intra-header errors for corrections. The threshold comparator module 430-*a* may signal for activation of an inter-frame module 505 at or about that time, controlling the frequency error correction module 425-*a* to use inter-frame error for corrections.

The inter-frame module 505 may use inter-frame phase difference measurements to calculate frequency errors for carrier tracking purposes when signaled by the threshold comparator module 430-*a*. The threshold comparator module 430-*a* may monitor an inter-header phase difference to determine whether an acquired wireless signal is lost. The threshold comparator module 430-*a* may signal for reactivation of the intra-header module 405-*a* when the inter-frame-phase difference measurements exceed a second threshold level (which may be a different level than that used for inter-frame module 505 activations). The threshold comparator module 430-*a* may signal to suspend the inter-frame module 505 when the inter-frame-phase difference measurements exceed the second threshold level.

Figure 6:
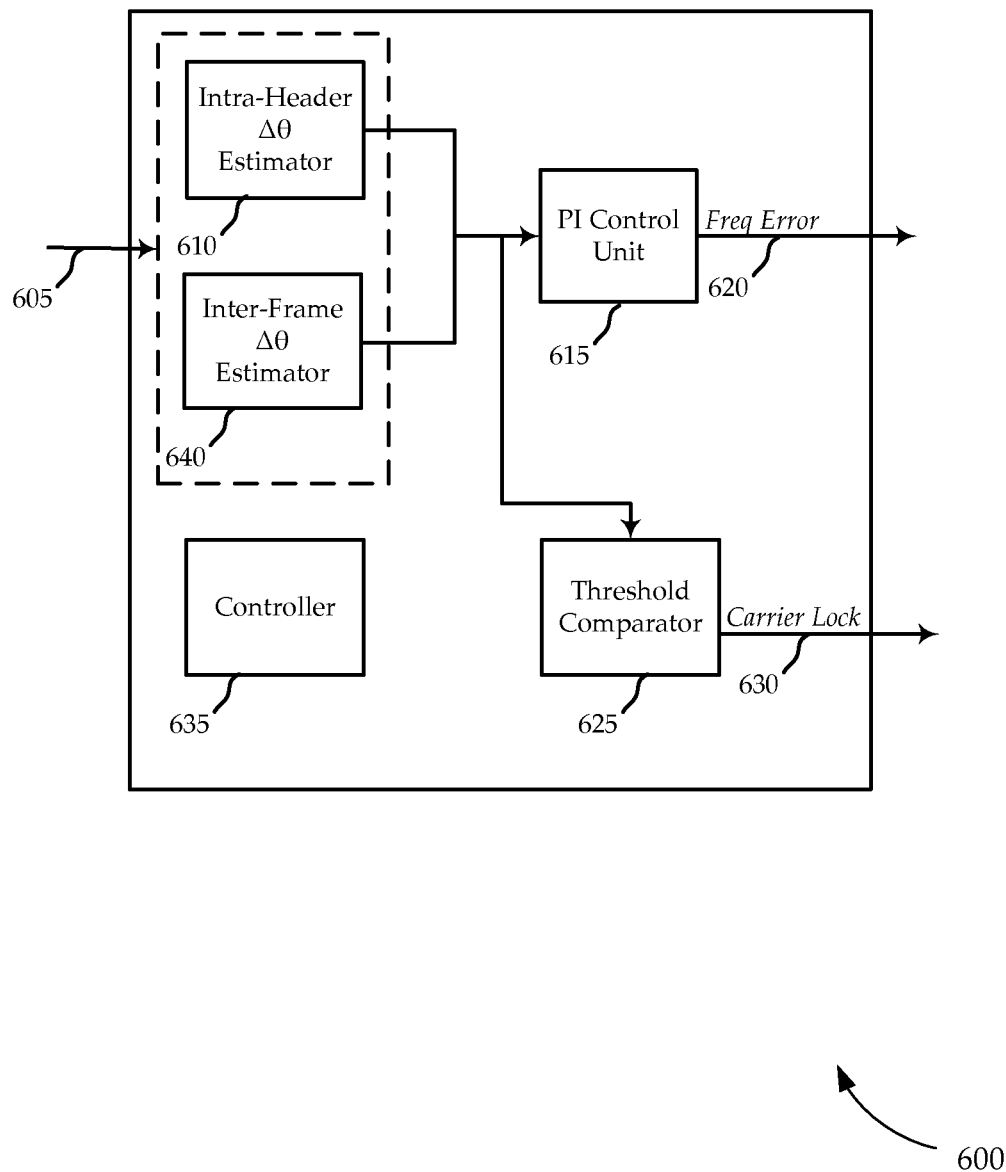
FIG. 6 is a block diagram illustrating a configuration for delta-theta method of frequency estimation configured according to various embodiments of the invention.

Turning to FIG. 6, a block diagram illustrates a frequency correction module 600 that may be implemented, for example, in the user terminal 130 of FIG. 1 or 3 or, more specifically, in the header processing module 310 of FIG. 3 or 4. Phase information 605 from the physical layer headers may be provided to the estimators 610, 640 (e.g., once per frame), and the frequency error calculations may be updated (e.g., at the same rate). The frequency correction module 600 may generate a frequency error metric 620 that may be used to correct the frequency.

Turning to a more complete description, once the physical layer frame synchronization has been achieved, an intra-header $\Delta\theta$ estimator 610 (which may, for example, be the intra-header module 450 of FIG. 4 or 5) begins processing phase information 605 within a given physical layer header. A frequency error estimate may be used for carrier acquisition. The header 205-*a* and subcode 215-*a*, 215-*b*, 220 structure from FIG. 2B will be used for purposes of example, while noting that other code structures are contemplated in other embodiments.

In one embodiment, the intra-header $\Delta\theta$ estimator 610 uses data points from the codeword search to calculate a frequency error based on differences in phase from subcode to subcode. The intra-header $\Delta\theta$ estimator 610 may receive the I and Q results (extracted from each subcode 215-*a*, 215-*b*, 220), and run the results through a rectangular-to-polar conversion. The resulting theta value is the phase estimate for the subcode. Thus, in one embodiment, a phase estimate for each of the three Walsh codes 215-*a*, 215-*b*, 220 in a physical layer header is generated as $\theta_1$, $\theta_2$, and $\theta_3$ inputs.

The overall $\Delta\theta$ value may be calculated using what may be referred to as a Sine Delta Theta technique:

$$\text{freq\_err} = \sin(\theta_2 - \theta_1) + \sin(\theta_3 - \theta_2).$$

An alternate technique, which may be referred to as simply a Delta Theta technique, is to directly calculate an average phase delta over 32 symbols:

$$\Delta\theta = 0.5 \ast [(\theta_2 - \theta_1) + (\theta_3 - \theta_2)],$$

where each delta is mapped to the interval [−180°, 180°] before adding the deltas.

In either case, the error value may be valid as long as $|\theta_2 - \theta_1| < 180°$ and $|\theta_3 - \theta_2| < 180°$. In each case, the method for calculating a frequency estimate uses data points in a given codeword to calculate frequency error based on differences in phase from subcode to subcode within the given codeword. The frequency error metric may be input to a PI control unit 615 (which may be the frequency error correction module 425 of FIG. 4 or 5) to generate a frequency error value 620 to pull the digital demodulator frequency. In one embodiment, the frequency error value 620 is combined with, or includes, the random frequency generator signal and a known offset signal to make up a signal in a control loop to correct the frequency.

The intra-header $\Delta\theta$ estimator 610 also transmits the frequency error (or other metric based on differences in phase) to the threshold comparator 625 (which may be the threshold comparator module 430 of FIG. 4 or 5). When the error drops below a threshold (e.g., a programmable threshold), the threshold comparator unit 625 may send a carrier lock signal 630 (which may be sent to a controller 635 on the frequency correction module 600, or elsewhere). The controller 635 may assert carrier lock based on the signal, and frequency control may be handed over to an inter-frame delta-theta calculation (e.g., undertaken by inter-frame $\Delta\theta$ estimator 640).

The inter-frame $\Delta\theta$ estimator 640 (which may be the inter-frame module 505 of FIG. 5) may generate a delta-theta frequency estimate used for carrier tracking. The frequency error is calculated as the phase differential between physical layer headers in different frames (e.g., adjacent frames). This estimate may be used to drive the loop when carrier lock has been achieved. In one embodiment, the inter-frame Δθ estimator 640 may receive a phase estimate for a physical layer header (e.g., the full 96-symbol PL header). Once per physical frame, a new theta value may be received. Therefore, the inter-frame Δθ estimator 640 may receive the theta value for each frame, and calculate a frequency estimate for frame k per the following equation:

$$dt\_est(k)=(\text{Theta}\_Plh(k)-\text{Theta}\_Plh(k-1)).$$

This frequency error estimation is valid as long as $$|\text{Theta}\_Plh(k)-\text{Theta}\_Plh(k-1)|<180°.$$

The inter-frame frequency error metric from the inter-frame Δθ estimator 640 may be input to a PI control module 615. The PI control module 615 may include combined, or distinct, processing units for the errors from the intra-header Δθ estimator 610 and inter-frame Δθ estimator 640. Regardless, a usable frequency error value 620 may again be generated to pull the digital demodulator frequency. In one embodiment, the frequency error value 620 is combined with, or includes, the random frequency generator signal and a known offset signal to make up a signal in a control loop to correct the frequency.

The inter-frame Δθ estimator 640 also transmits the frequency error or other metric based on differences in phase to a threshold comparator unit 625. When the error rises above a threshold (which may be different the threshold for the acquisition period), the threshold comparator unit 625 may send a carrier lock lost signal 630 (which may be sent to a controller 635 on the frequency correction unit 600, or elsewhere). The controller 635 may release the carrier lock based on the carrier lock lost signal 630, and frequency control may be handed over to a intra-header delta-theta calculation (e.g., undertaken by intra-header Δθ estimator 610).

The frequency error 620 that is output may be a signed value that is the sum of the random frequency generator, and may be output by either the intra-header Δθ estimator 610 or inter-frame Δθ estimator unit 640 (or both).

The functional modules of the configuration of FIG. 4 or 5, or the frequency correction module 600 of FIG. 6 may each, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7:
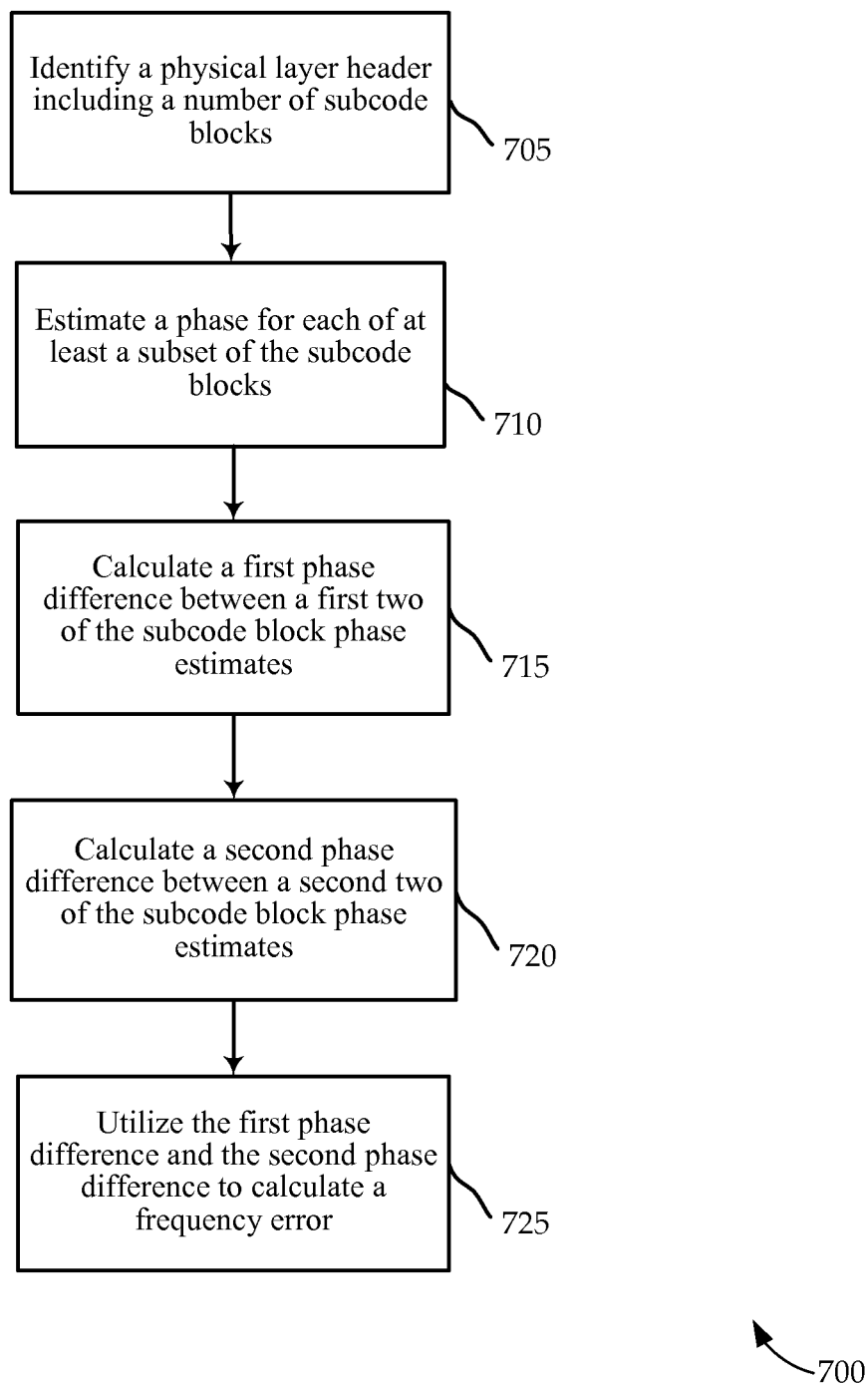
FIG. 7 is a flow diagram illustrating a method of frequency estimation configured according to various embodiments of the invention.

FIG. 7 is a flowchart illustrating a method 700 for frequency estimation according to various embodiments of the invention. The method 700 may be performed, for example, in whole or in part, by the terminal 130 described with reference to FIG. 1 or 3, or, more specifically, with the header processing module 310 of FIG. 3 or 4, the configuration 500 of FIG. 5, or the frequency correction module 600 of FIG. 6.

At block 705, a physical layer header, including a number of subcode blocks, is identified. At block 710, a phase is estimated for each of at least a subset of the subcode blocks. At block 715, a first phase difference is calculated between a first two of the subcode block phase estimates. At block 720, a second phase difference is calculated between a second two of the subcode block phase estimates. At block 725, the first phase difference and the second phase difference are utilized to calculate a frequency error.

Figure 8:
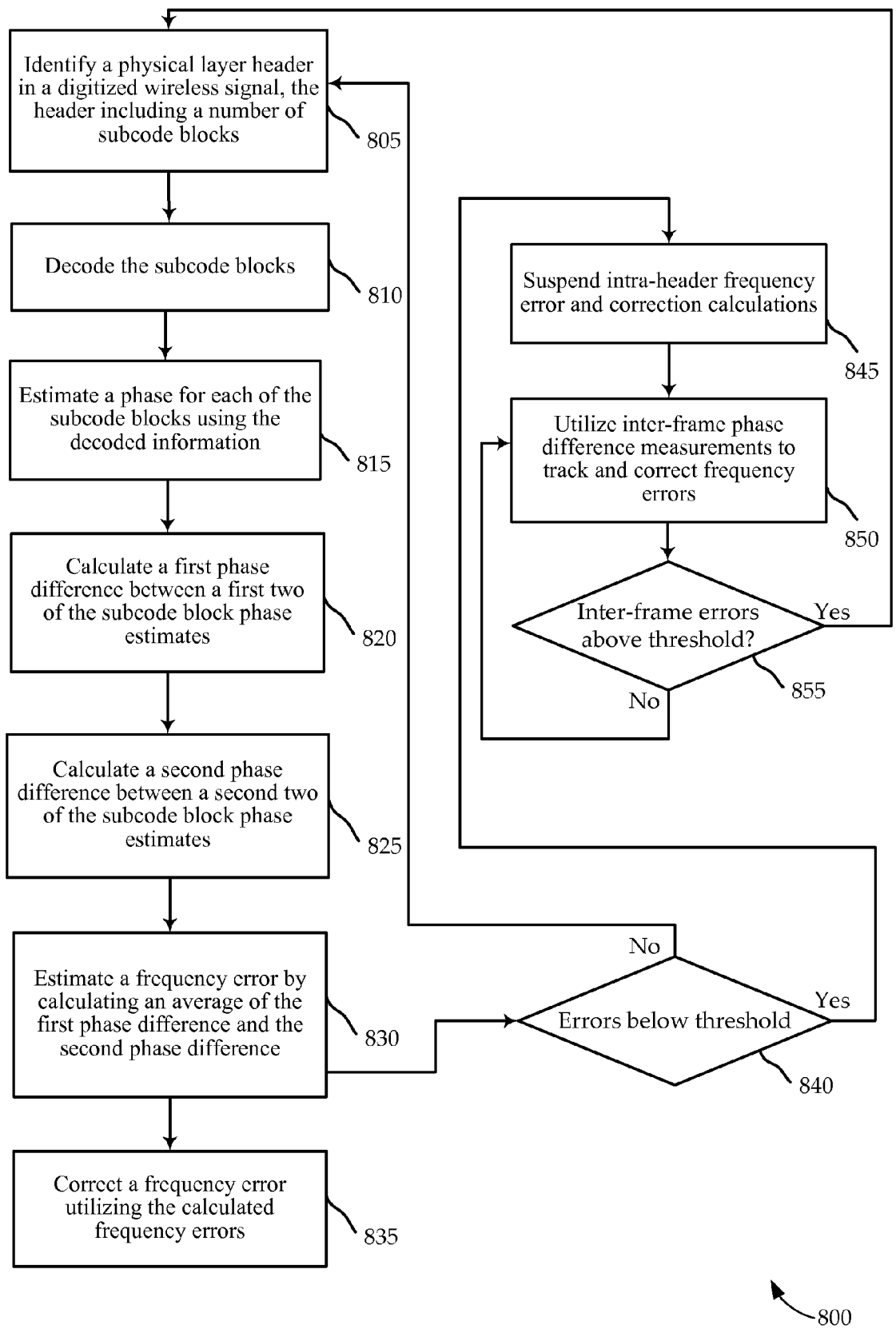
FIG. 8 is a flowchart illustrating a method for carrier acquisition and tracking according to various embodiments of the invention.

FIG. 8 is a flowchart illustrating a method 800 for carrier acquisition and tracking according to various embodiments of the invention. The method 800 may be performed, for example, in whole or in part, by the terminal 130 described with reference to FIG. 1 or 3, or, more specifically, with the header processing module 310 of FIG. 3 or 4, the configuration 500 of FIG. 5, or the frequency correction module 600 of FIG. 6.

At block 805, a physical layer header in a digitized wireless signal is identified, the header including a number of subcode blocks. At block 810, the subcode blocks are decoded. At block 815, a phase is estimated for each of the subcode blocks using the decoded information. At block 820, a first phase difference is calculated between a first two of the subcode block phase estimates. At block 825, a second phase difference is calculated between a second two of the subcode block phase estimates. At block 830, a frequency error is estimated by calculating an average of the first phase difference and the second phase difference. At block 835, a frequency error is corrected utilizing the calculated frequency errors.

At block 840 a determination is made whether the intra-frame errors are below a threshold. If the intra-header errors are not below a threshold, the frequency estimation and correction process (steps 805-840) is repeated. If the intra-header errors are below the threshold, the process continues at block 845, where the intra-header frequency estimation and correction calculations are suspended. At block 850, inter-frame phase difference measurements are utilized to track and correct frequency errors. At block 855 a determination is made whether the inter-frame errors are above a threshold (whether the same, or different, from the threshold associated with the intra-header threshold). If the inter-frame errors are below a threshold, the inter-frame process continues at block 845. If not, the frequency estimation and correction process (steps 805-840) is performed, and the inter-frame frequency estimation and correction calculations are suspended.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A device for frequency estimation comprising:
   an intra-header module configured to estimate, for each of a plurality of physical layer headers of a received wireless signal, an intra-header frequency error utilizing intra-header phase difference measurements;
   a frequency error correction module, communicatively coupled with the intra-header module, and configured to iteratively correct a frequency error for the received wireless signal utilizing the calculated frequency errors;
   a threshold comparator module, communicatively coupled with the frequency correction module, and configured to signal the frequency error correction module to suspend the intra-header corrections when intra-header frequency errors fall below a threshold and signal for activation of an inter-frame module when intra-header frequency errors fall below the threshold; and
   the inter-frame module, communicatively coupled with the threshold comparator module, and configured to track a frequency error for the received wireless signal utilizing inter-frame phase difference measurements when signaled by the threshold comparator module.

2. The device of claim 1, wherein the threshold comparator module is further configured to signal to reactivate the intra-header module when the inter-frame-phase difference measurements exceed a second threshold level and signal to suspend the inter-frame module when the inter-frame-phase difference measurements exceed the second threshold level.

3. The device of claim 1, wherein the intra-header module comprises a phase estimation module, a phase differential calculation module, and a frequency error estimation module, and is configured to calculate the intra-header frequency errors by calculating a difference measurement between a first phase difference and a second phase difference in each of the physical layer headers.

4. The device of claim 3, wherein the frequency error correction module is further configured to correct the frequency for receiving the wireless signal utilizing the intra-header frequency errors when the intra-header frequency errors are above the threshold.

5. The device of claim 3, wherein the intra-header module is further configured to calculate the intra-header frequency errors by averaging the first phase difference and the second phase difference.

6. The device of claim 3, wherein the intra-header module is further configured to generate the first phase difference and the second phase difference in each of the physical layer headers by estimating phases of decoded subcode data of each of a plurality of subcode blocks of the physical layer headers.

7. The device of claim 6, wherein the plurality of subcode blocks of the physical layer headers comprise at least three subcode blocks.

8. The device of claim 7, wherein the at least three subcode blocks each comprise a Walsh code block.

9. The device of claim 1, wherein the intra-header module is further configured to identify one or more of the plurality of physical layer headers by performing a frequency search of the received wireless signal.

10. The device of claim 9, wherein the frequency search comprises a random frequency search.

11. The device of claim 9, wherein the intra-header module is further configured to identify the one or more physical layer headers using a unique word correlation.

12. A method for frequency estimation comprising:
   estimating, for each of a plurality of physical layer headers of a received wireless signal, an intra-header frequency error utilizing intra-header phase difference measurements;
   iteratively correcting a frequency error for the received wireless signal utilizing the estimated intra-header frequency errors; and
   activating inter-frame frequency error correction when the intra-header frequency errors fall below a threshold, the activating comprising:
      suspending the intra-header corrections utilizing the estimated intra-header frequency errors; and
      tracking a frequency error for the received wireless signal utilizing inter-frame phase difference measurements.

13. The method of claim 12, further comprising:
   reactivating intra-header frequency error correction utilizing the estimated intra-header frequency errors when the inter-frame-phase difference measurements exceed a second threshold level; and
   suspending the tracking the frequency error utilizing the inter-frame phase difference measurements when the inter-frame phase difference measurements exceed the second threshold level.

14. The method of claim 12, further comprising:
   calculating the intra-header frequency errors by calculating a difference measurement between a first phase difference and a second phase difference in each of the physical layer headers.

15. The method of claim 14, further comprising:
   correcting the frequency for receiving the wireless signal utilizing the intra-header frequency errors when the intra-header frequency errors are above the threshold.

16. The method of claim 14, wherein utilizing the first phase difference and the second phase difference to calculate the intra-header frequency error comprises averaging the first phase difference and the second phase difference.

17. The method of claim 14, wherein calculating the intra-header frequency errors comprises:
generating the first phase difference and the second phase difference in each of the physical layer headers by estimating phases of decoded subcode data of each of a plurality of subcode blocks of the physical layer headers.

18. The method of claim 17, wherein the plurality of subcode blocks of the physical layer headers comprise at least three subcode blocks.

19. The method of claim 18, wherein the at least three subcode blocks each comprise a Walsh code block.

20. The method of claim 12, further comprising:
identifying one or more of the plurality of physical layer headers by performing a frequency search of the received wireless signal.

21. The method of claim 20, wherein the frequency search comprises a random frequency search.

22. The method of claim 20, wherein identifying one or more of the plurality of physical layer headers is performed using a unique word correlation.

* * * * *